D. HUMMEL.
SEED THRESHING MACHINE.
APPLICATION FILED FEB. 25, 1909.

959,346.

Patented May 24, 1910.

2 SHEETS—SHEET 1.

Witnesses
T. P. Britt
E. C. Duffy

Inventor
Daniel Hummel

By
O. C. Duffy et au
Attorneys

D. HUMMEL.
SEED THRESHING MACHINE.
APPLICATION FILED FEB. 25, 1909.
959,346.
Patented May 24, 1910.
2 SHEETS—SHEET 2.
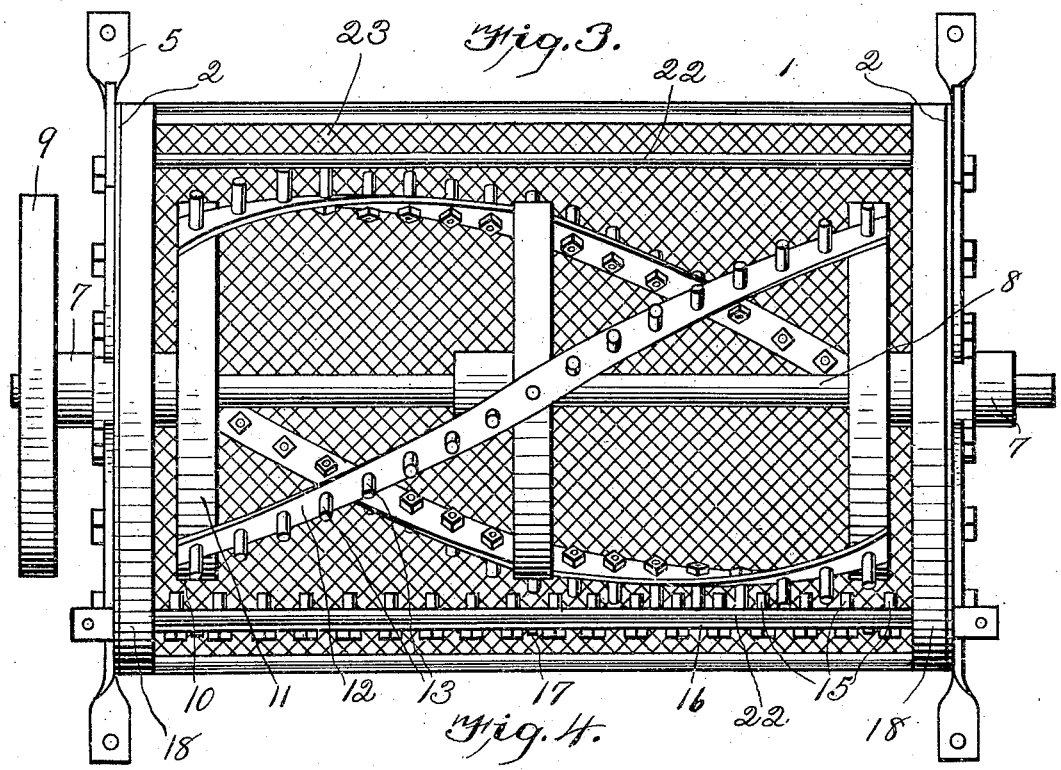
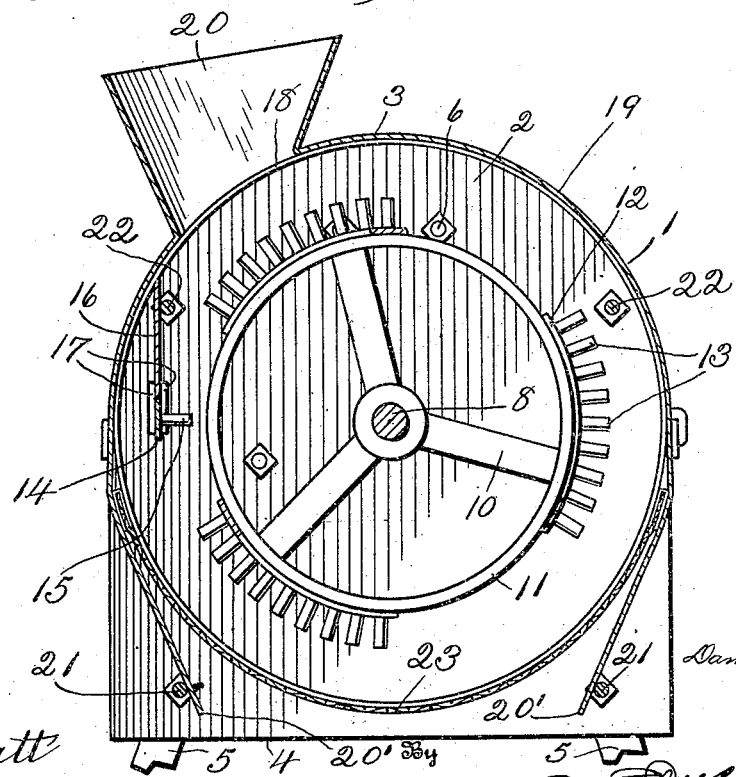

UNITED STATES PATENT OFFICE.

DANIEL HUMMEL, OF LOUISVILLE, KENTUCKY.

SEED-THRESHING MACHINE.

959,346.  Specification of Letters Patent.  Patented May 24, 1910.

Application filed February 25, 1909. Serial No. 479,868.

*To all whom it may concern:*

Be it known that I, DANIEL HUMMEL, a citizen of the United States, residing at Louisville, in the county of Jefferson and State of Kentucky, have invented certain new and useful Improvements in Seed-Threshing Machines; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to a seed thresher for threshing onion seed and the like and has for its object to provide a device of this class which is particularly simple in its construction, cheap and easy to manufacture, strong, durable and efficient.

With this object in view my invention consists in the novel construction of the seed thresher and particularly in the agitator, stationary tooth bar and guide therefor; and my invention also consists in the novel construction of the hood and means for securing the same in position.

My invention also consists in certain other novel features of construction and in combinations of parts, all of which will be first fully described and afterward specifically pointed out in the appended claims.

Figure 1:
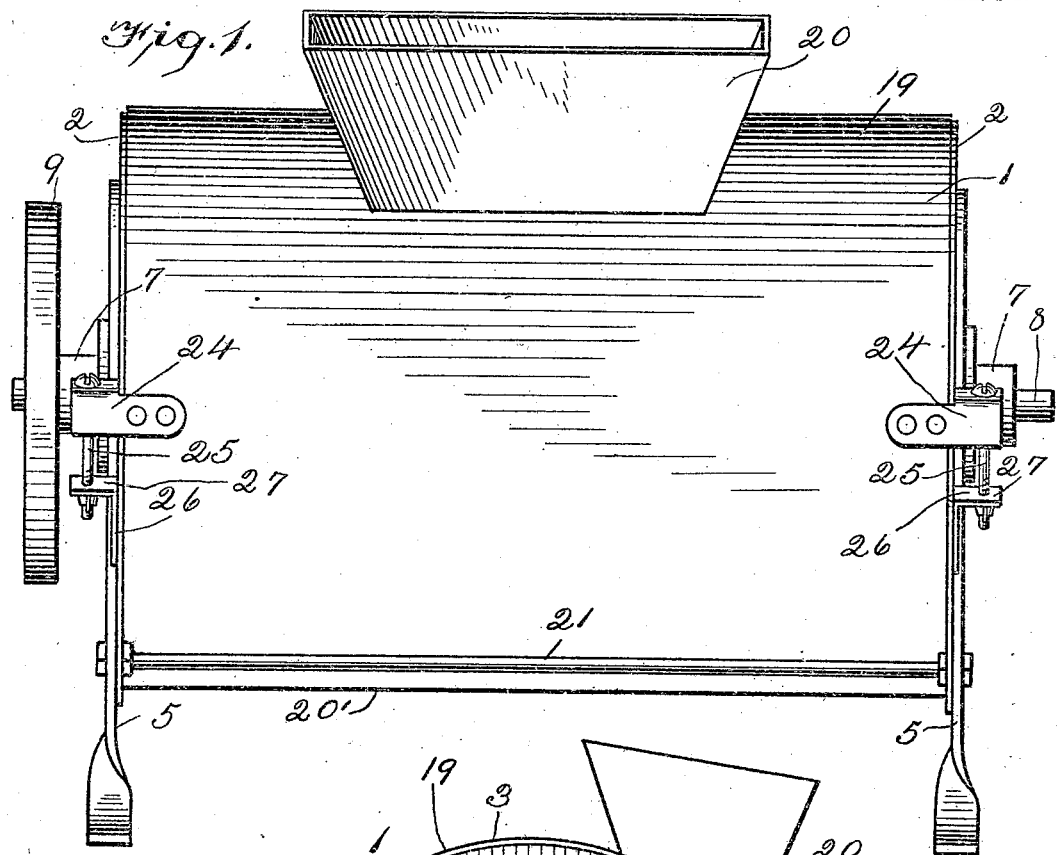
Figure 2:
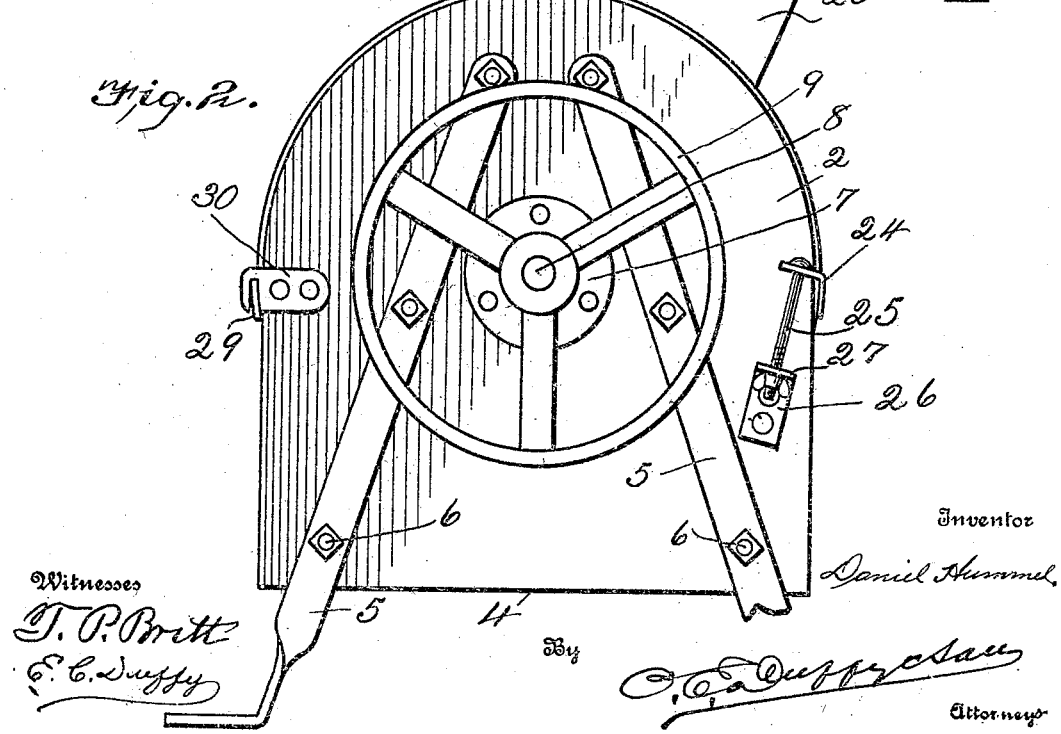

Referring to the accompanying drawings: Figure 1 is a side elevation of the seed thresher. Fig. 2 is an end elevation of the same. Fig. 3 is a top plan view of the same with hood removed, and Fig. 4 is a central transverse vertical section taken through Fig. 1.

Like numerals of reference indicate the same parts throughout the several figures in which;

1 indicates the seed thresher which comprises the two end or side plates 2, said end or side plates 2 being formed with a curved top 3 and a straight bottom 4 as clearly shown in Fig. 2. Carried on each of the end plates 3 are the legs or supports 5 securely bolted to the end plates 3 by means of bolts 6. By reason of this construction the legs or supports 5 stiffen the end plates 3 forming battens therefor as will be clearly seen from Fig. 2.

The end plates 2 carry the journals or bearings 7 for the shaft 8, and carried on said shaft is a pulley wheel 9 although as is of course evident a crank or any other suitable means can be employed for turning the shaft 8. Carried on the shaft 8, as shown in Figs. 3 and 4, are preferably three spiders 10 having circular flanges 11 thereon to which tooth bars 12 carrying the teeth 13 are secured in the manner as shown in Fig. 3.

Arranged longitudinally of the machine is the stationary tooth bar 14 carrying the stationary teeth 15, said teeth on said bar 14 being arranged in such manner that the teeth 13 on the tooth bars 12 enter between each tooth on the tooth bar 14 as clearly shown in Fig. 3. The tooth bars 12 being spirally arranged on the spiders 10 allow the teeth 13 on each tooth bar 12 to successively pass between the teeth 15 on the stationary tooth bar 14 as is clearly shown in Fig. 3.

Arranged on the tooth bar 14 and disposed vertically above the same is a guide 16, said guide being provided with clips 17 on the bottom edge thereof for straddling the tooth bar 14 in order to securely maintain said guide 16 in position thereon as clearly shown in Fig. 4. The guide 16 extends longitudinally of the machine from end to end as shown in Fig. 3 and effectually prevents the seed from passing behind the stationary tooth bar 14 in such manner that the seed can be effectually engaged by the teeth on the tooth bars.

Formed on each of the end plates 2 is an annular flange 18 and arranged over said flanges 18 is a hood or cover 19, said hood or cover 19 being provided with a hopper 20 into which the seed is introduced. The hood or cover 19 passes around the flanges 18, the ends 20' thereof being held behind two longitudinal bolts 21 which longitudinal bolts 21 together with similar bolts 22 tie the end plates 3 together.

Carried under the flanges 18 as shown in Fig. 4 is a screen 23 which forms the bottom of the thresher.

Referring now to Figs. 1 and 2 it will be seen that means are provided for securing the hood or cover 19 securely in position on the machine. The hood or cover 19 is provided on one side thereof with two clips 24, each of said clips 24 carrying a bolt 25; while on each of the end plates 2 is provided a bracket 26 having a flange 27 through which flange the bolt 25 passes, a wing nut being employed for drawing the clip 24 toward the bracket 26, while on the opposite side of the hood or cover 19 a small strap 29 and a similar strap 30 is carried on each of the end plates 2, said straps 29 and 30 engaging each other as clearly shown in Fig. 2 by means of the bolts 25. The hood or cover 19 is drawn tightly around the flanges 18 on the end plates 2 in such manner that the machine is entirely covered.

Having thus described the several parts of my invention its operation is as apparent from the description taken in connection with the accompanying drawing. The seed is introduced through the hopper 20 and the spiral tooth bars are rotated by means of the wheel 9 or any other suitable element for transmitting motion. When the seed is introduced through the hopper 20 it is engaged by the teeth 13 and acted upon at the time that the teeth 13 pass between the teeth 13 of the stationary tooth bar 14.

Having thus fully described my invention what I claim as new and desire to secure by Letters Patent of the United States is:

1. A seed threshing machine comprising the end plates, a plurality of bolts tying said end plates together, a central shaft passing through said end plates, a plurality of spiders on said shaft, tooth bars arranged spirally on said spiders, a stationary tooth bar arranged longitudinally of the machine, teeth thereon to co-act with the teeth on the spirally arranged tooth bars, a guide arranged above the stationary tooth bar, the said end plates being each provided with an annular flange, a screen arranged under the annular flanges, a removable hood or cover carried on said annular flanges and means on said end plates and on said hood or cover for securing the hood or cover in position on said annular flanges, the whole arranged in such manner that the said hood or cover can be entirely removed from the machine to permit access to the interior thereof.

2. A seed threshing machine comprising two end plates, a shaft passing through said end plates, a plurality of spiders on said shaft, spirally arranged tooth bars on said spiders, a stationary tooth bar arranged longitudinally of the machine, a guide above said stationary tooth bar, a screen under said spirally arranged tooth bars, a removable cover, a hopper carried thereon, a fastening on said end plates and on said cover, and means on said end plates and on said cover for drawing the cover snugly around the said end plates.

In testimony whereof, I affix my signature, in presence of two witnesses.

DANIEL HUMMEL.

Witnesses:
   George S. Nicolas,
   Victor L. Nicolas.